(12) United States Patent
Ibarra Hernandez et al.

(10) Patent No.: US 10,429,596 B1
(45) Date of Patent: Oct. 1, 2019

(54) OPTICAL CABLE FIXTURE

(71) Applicant: INTERNATIONAL BUSINESS MACHINES CORPORATION, Armonk, NY (US)

(72) Inventors: Jesus Ernesto Ibarra Hernandez, Zapopan (MX); Oscar E. Flores Pantoja, Zapopan (MX)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/005,975

(22) Filed: Jun. 12, 2018

(51) Int. Cl.
   *G02B 6/38* (2006.01)
   *G02B 6/42* (2006.01)

(52) U.S. Cl.
   CPC ......... *G02B 6/3898* (2013.01); *G02B 6/4284* (2013.01)

(58) Field of Classification Search
   CPC .............................. G02B 6/3898; G02B 6/4284
   See application file for complete search history.

(56) References Cited

U.S. PATENT DOCUMENTS

| 2007/0243741 A1 | 10/2007 | Yang | |
| 2011/0081114 A1* | 4/2011 | Togami | G02B 6/4246 385/76 |
| 2013/0216188 A1* | 8/2013 | Lin | G02B 6/3893 385/77 |
| 2016/0043535 A1 | 2/2016 | Benner et al. | |
| 2016/0299299 A1 | 10/2016 | Durrant et al. | |
| 2018/0024300 A1* | 1/2018 | Wu | G02B 6/3636 385/39 |

FOREIGN PATENT DOCUMENTS

JP    2012088365 A    5/2012

* cited by examiner

*Primary Examiner* — Omar R Rojas
(74) *Attorney, Agent, or Firm* — Michael O'Keefe (57) ABSTRACT

A support assembly including a handle on a top surface of an optical connector, side clips removably coupled to opposite sides of the handle, such that a clamping force is applied to opposite sides of the optical connector to prevent movement between the handle and the optical connector, and a bottom clip removably coupled to a bottom of the handle, the bottom clip including a flange to capture a pull table extending from a rear of the optical connector. An Active Optical Cable (AOC) connector support assembly including a handle, side clips secured to opposite sides of the handle, such that a clamping force is applied to the opposite sides of the AOC connector to prevent movement between the handle and the AOC connector; and a bottom clip secured to a bottom of the handle, the bottom clip including a flange to secure the AOC connector.

18 Claims, 14 Drawing Sheets

OPTICAL CABLE FIXTURE

BACKGROUND

The present invention relates generally to a protector for a cable, and more particularly to a mechanical protector for a fiber optic cable.

A fiber optic cable contains one or more optical fibers which light passes through, providing a high speed data connection. Each optical fiber may have a protective layer and the fiber optic cable has an outer protective cover surrounding the one or more optical fibers. Each end of the fiber optic cable may have an optical fiber connector. The optical fiber connector allows continuous data communication between the fiber optic cable and a corresponding receptacle which either end of the fiber optic cable is plugged into. A type of fiber optic cable is an active optical cable (hereinafter "AOC"). An AOC contains optical fibers and a transceiver at both ends of the AOC. The transceiver sends and receives digital electrical input, as a traditional copper cable does, converts the digital electrical input to analog for transmission along the fiber optic cable, and converts the analog input to digital for output. An AOC may be used in data centers and high-performance applications. An AOC may be used in a common electrical port which can accept either a copper cable or an AOC.

SUMMARY

Embodiments of the present invention disclose a support assembly including a handle on a top surface of an optical connector, side clips removably coupled to opposite sides of the handle, such that a clamping force is applied to opposite sides of the optical connector to prevent movement between the handle and the optical connector, and a bottom clip removably coupled to a bottom of the handle, the bottom clip including a flange to capture a pull table extending from a rear of the optical connector.

Embodiments of the present invention disclose an Active Optical Cable (AOC) connector support assembly including a handle, side clips secured to opposite sides of the handle, such that a clamping force is applied to the opposite sides of the AOC connector to prevent movement between the handle and the AOC connector; and a bottom clip secured to a bottom of the handle, the bottom clip including a flange to secure the AOC connector.

Embodiments of the present invention disclose a support assembly including a handle on a top surface of an optical connector, side clips secured to opposite sides of the handle, such that a clamping force is applied to the opposite sides of the optical connector to prevent movement between the handle and the optical connector, wherein each of the side clips comprises a flange extending beneath a bottom surface of the optical connector; and a bottom clip secured to a bottom of the handle, the bottom clip including a flange to capture a pull table extending from a rear of the optical connector.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The use of fiber optic cables has increased with advantages such as a longer length and a lower bit-error rate compared with copper cables. Fiber optic cables may cost more than a comparable copper cable. Fiber optic cables with a transceiver connector at each of the two ends, for example, an active optical cable (hereinafter "AOC"), are prone to damage cause by poor handling when inserting the optical fiber connecter into a receptacle or removing the optical fiber connecter from a receptacle. Common failures of the AOC may include breakage of the transceiver, breakage of the fiber optic cable, and separation of the fiber optic cable from the transceiver, among other failures. In other cases, a corner of the optical fiber connector may fail or break and result in a failed connection. For example, the AOC might be misaligned when plugged into a corresponding receptacle, resulting in the failed connections and additional damage to the AOC or the corresponding receptacle. In an example, a rack in a data center may have one hundred cables connected to the rack, and greater than sixty of the cables may be AOCs. The data center may have between 500 and 10,000 racks. When an AOC fails, an operator may need to debug all of the cables. Debugging often requires unplugging each and every cable to identify which of the cables is failing or has failed. Once the failed component is identified, each and every cable must be plugged back into the rack, thereby increasing lost time and assembly cost. A failure of an AOC may render the AOC unusable and require its replacement. Additionally, considering each AOC costs, for example $400, replacement costs of the AOCs add up quickly. Innovative solutions to prevent the damage and replacement described above have the potential to drastically reduce equipment's downtime and reduce maintenance and replacement cost associated with the AOCs failures alone. For example, AOC replacement costs for a single data center can average approximately $7000.

In an example, an AOC may have four optical fibers capable of operating at transmission speeds up to 10 Gigabytes/second, a four-channel transceiver at each end of the AOC, and a length of up to four thousand meters.

The present invention generally relates to a support assembly for a fiber optic cable, and more particularly to a support assembly secured to the optical fiber connector of a fiber optic cable to prevent mechanical damage and interrupted functionality. An embodiment by which to provide the support assembly is described in detail below by referring to the accompanying drawings in FIGS. 1 to 17. Those skilled in the art will readily appreciate that the detailed description given herein with respect to these figures is for explanatory purposes as the invention extends beyond these limited embodiments.

The support assembly provides a physical outer assembly which covers the connector of a cable and may be used by an operator during handling to reduce damage of the cable and damage to the connector at an end of the cable, for example an AOC. The use of the support assembly may lead to a reduction in replacement costs of the cable, and a reduction in re-assembly costs of unplugging a group of cables into a corresponding group of receptacles, identifying a failing cable from the group of cables, and re-plugging the group of cables, when a cable has failed. The support assembly may reduce the possibility the cable becomes separated from the connector at an end of the cable, and that the connector is damaged during plugging in or unplugging.

Figure 1:
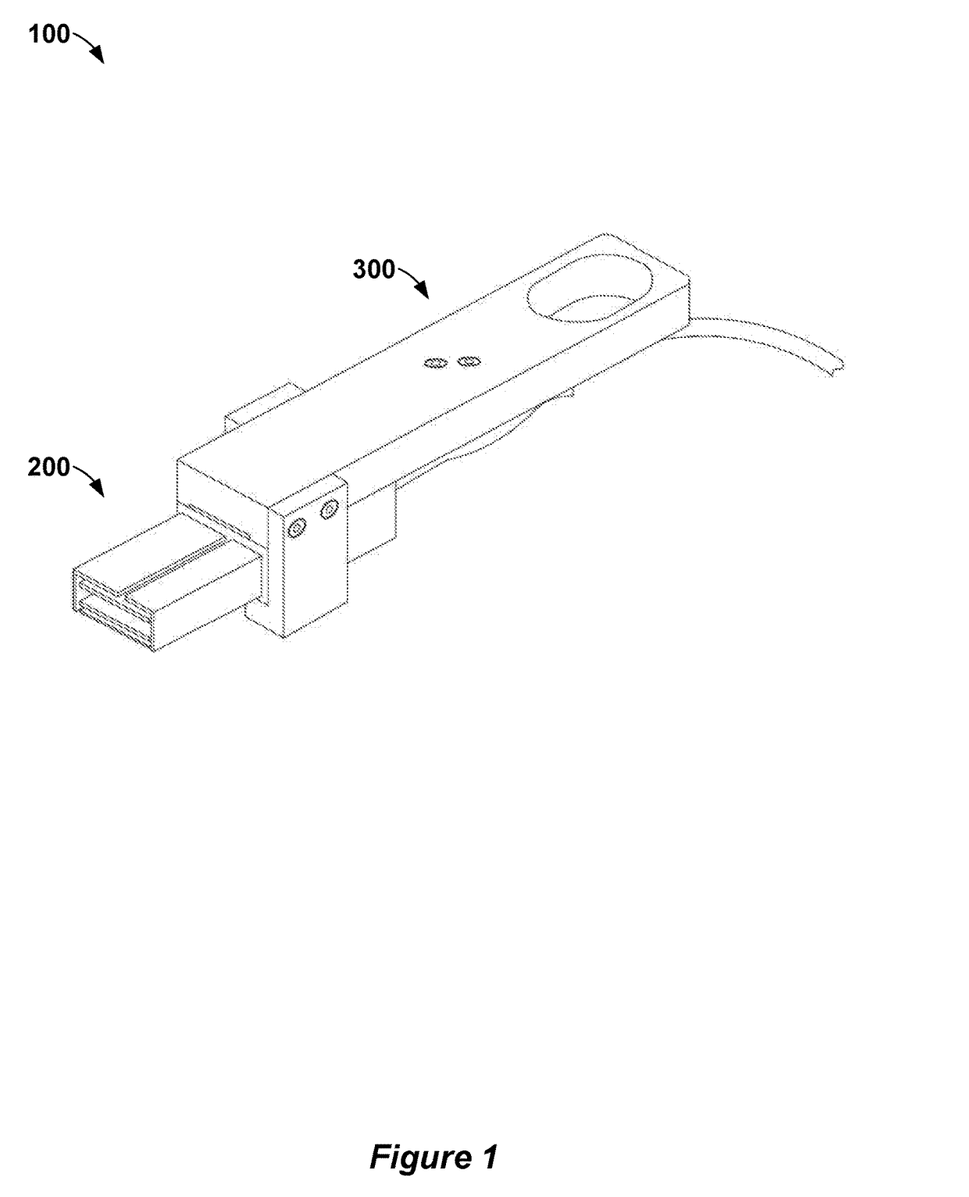
FIG. 1 is an isometric view of a first end of a fiber optic cable and a support assembly, in accordance with an embodiment of the present invention.

Referring now to FIG. 1, an isometric view of a first end of an assembly 100 is shown, in accordance with an embodiment of the present invention. The assembly 100 may include a first end of a fiber optic cable 200, and a support assembly 300. These components are described in further detail below.

Figure 2:
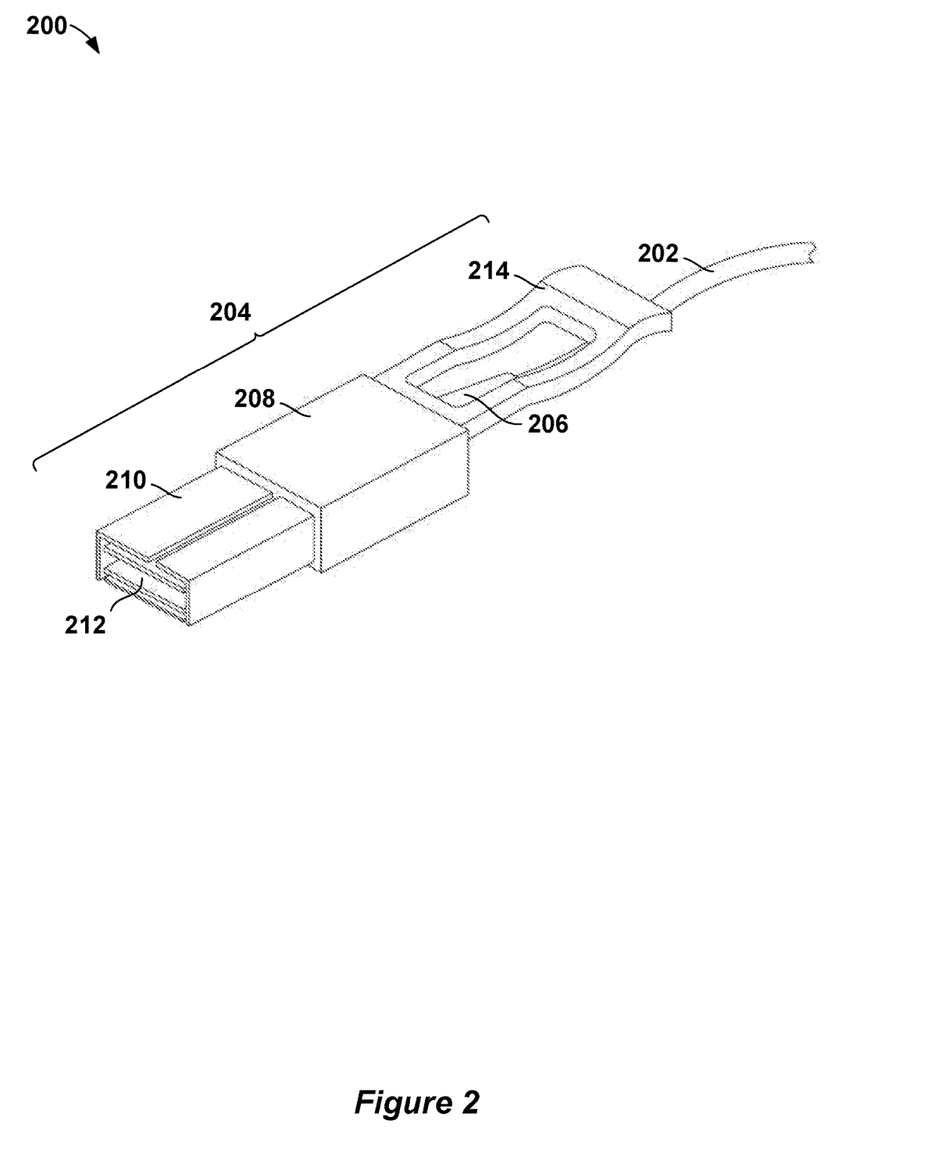
FIG. 2 is an isometric view of the first end of the fiber optic cable, in accordance with an embodiment of the present invention.

Referring now to FIG. 2, an isometric view of the first end of the fiber optic cable 200 is shown, in accordance with an embodiment of the present invention. In an exemplary embodiment, the fiber optic cable 200 may be an active optical cable (hereinafter "AOC"). In an embodiment, the first end of the fiber optic cable 200 is fitted with a connector 204.

The optical cable 202 may have an outer protective cover surrounding one or more optical fibers, where each optical fiber has a protective layer. Some fiber optic cables are manufactured with strain relief 206 designed to provide additional support at the intersection between the optical cable 202 and the connector 204, in an effort to lessen or prevent failures at the intersection between the optical cable 202 and the connector 204. The strain relief may typically surround an end of the optical cable 202 where the optical cable 202 is coupled to the connector 204.

The connector 204 may include the housing 208, a metal coupling 210, and a pull tab 214. The housing 208 may include an optical transceiver which converts electronic data input to the first end of the fiber optic cable 200 into laser light data transmitted along the one or more optical fibers in the optical cable 202. The laser light data may be converted into electronic data output at a second transceiver in a second housing 208 at a second end (not shown) of the fiber optic cable 200. The housing 208 may contain one or more optical transceivers, each of the one or more optical transceivers may be connected to one of the one or more optical fibers of the optical cable 202.

The metal coupling 210 is coupled to the housing 208 and is configured to plug into a corresponding receptacle (not shown). When the fiber optic cable 200 is plugged in, the fiber optic cable 200 is electrically connected to the receptacle. Typically, a circuit board finger 212 (or electrode) is positioned within the metal coupling 210 and is electrically connected to the one or more optical transceivers in the housing 208. A single connector 204 might have one or more circuit board fingers 212.

The pull tab 214 protrudes from a back of the housing 208 and may be used for manual removal of the fiber optic cable 200 from a corresponding receptacle. Without the pull tab 214, operators attempting to remove the fiber optic cable 200 would be tempted to pull on the optic cable 202. Doing so would routinely damage the cable 202 and cause the optical cable 202 to separate from the housing 208. Using the pull tab 214 to remove the fiber optic cable 200 may not prevent pulling the fiber optic cable 200 at an angle, possibly causing damage to the receptacle, the metal coupling 210 or the housing 208. Additionally, while the pull tab 214 may provide assistance to the operator removing the fiber optic cable 200 from the receptacle, the pull tab 214 does not provide any assistance to the operator attempting to plug the fiber optic cable 200 into the receptacle.

Figure 3:
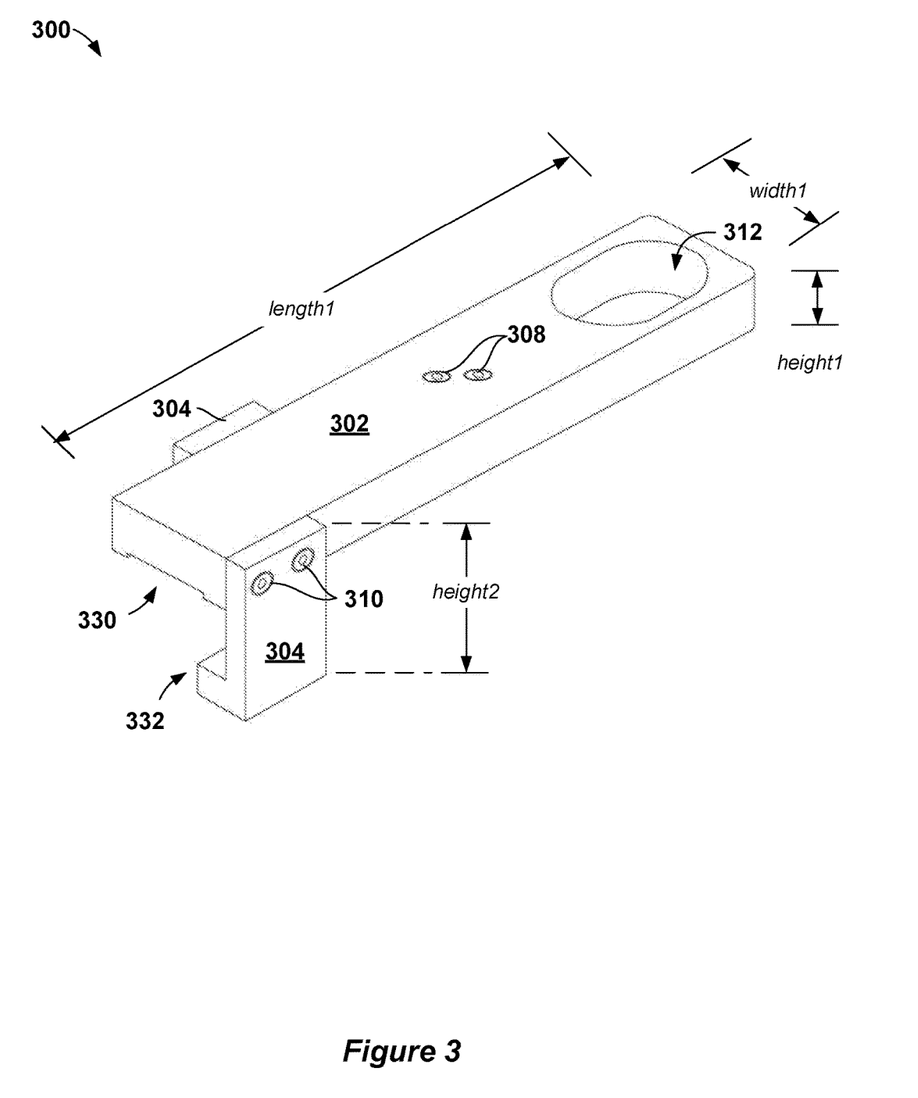
FIG. 3 is an isometric view of the support assembly, in accordance with an embodiment of the present invention.
Figure 4:
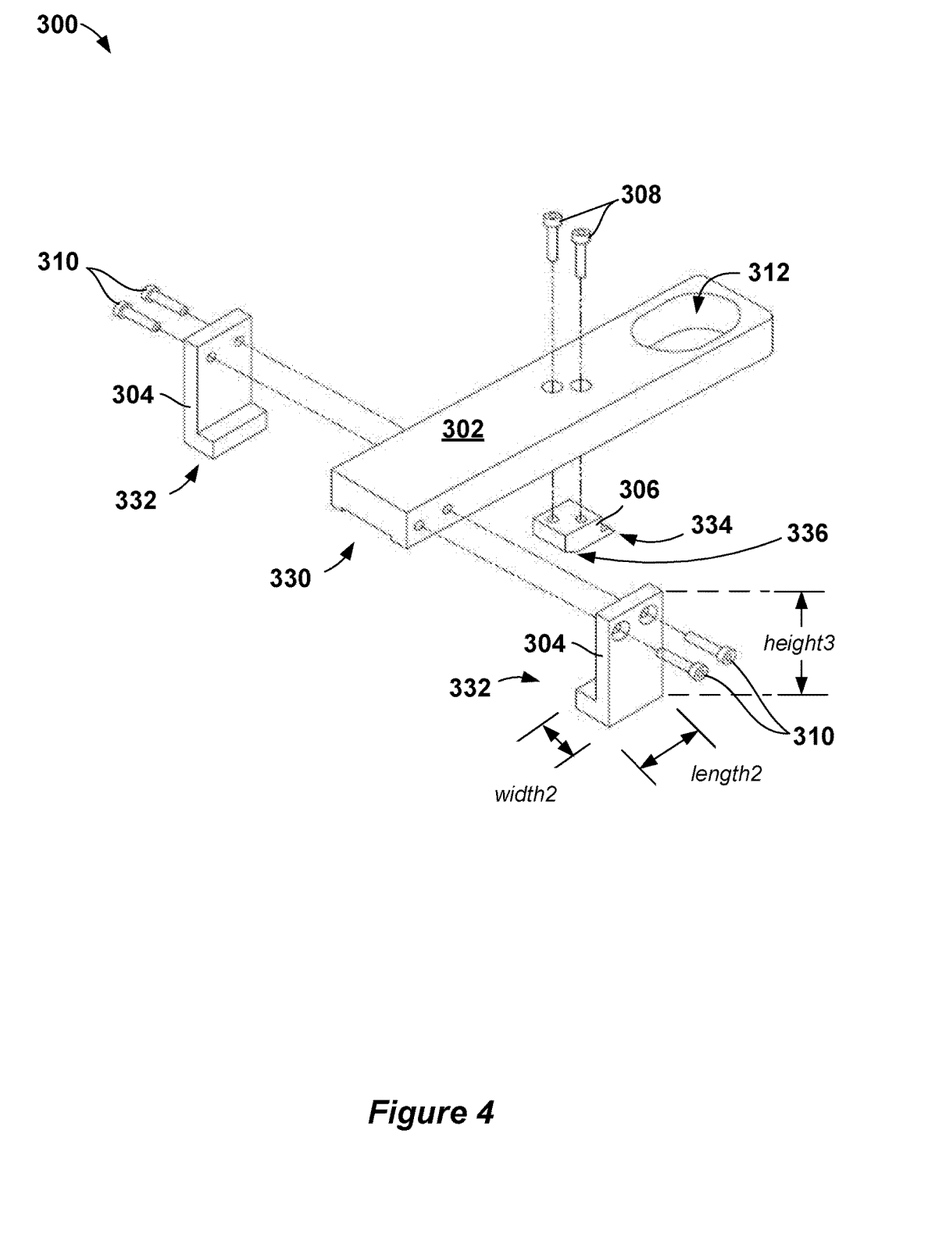
FIG. 4 is an exploded isometric view of the support assembly, in accordance with an embodiment of the present invention.
Figure 5:
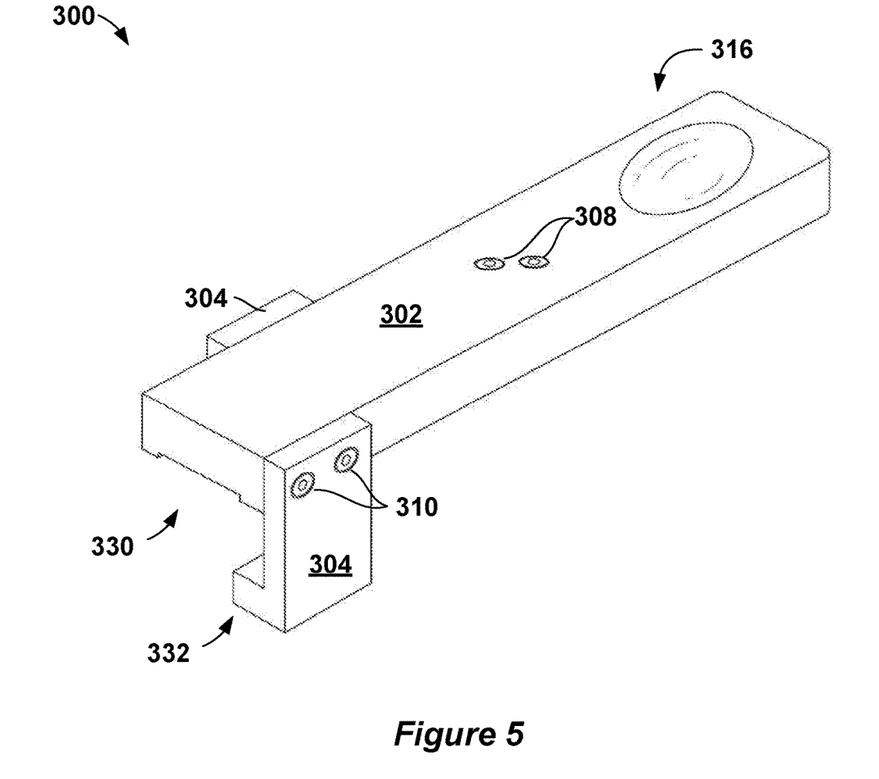
FIG. 5 is an isometric view of the support assembly, in accordance with an embodiment of the present invention.
Figure 6:
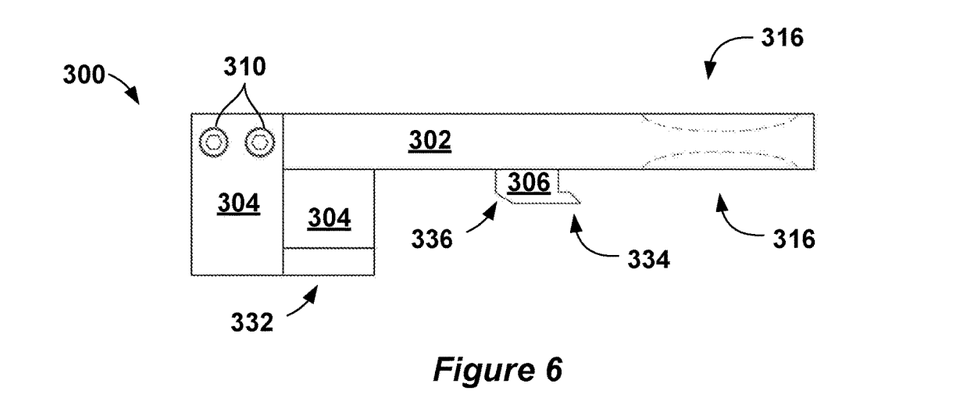
FIG. 6 is a side view of the support assembly, in accordance with an embodiment of the present invention.
Figure 7:
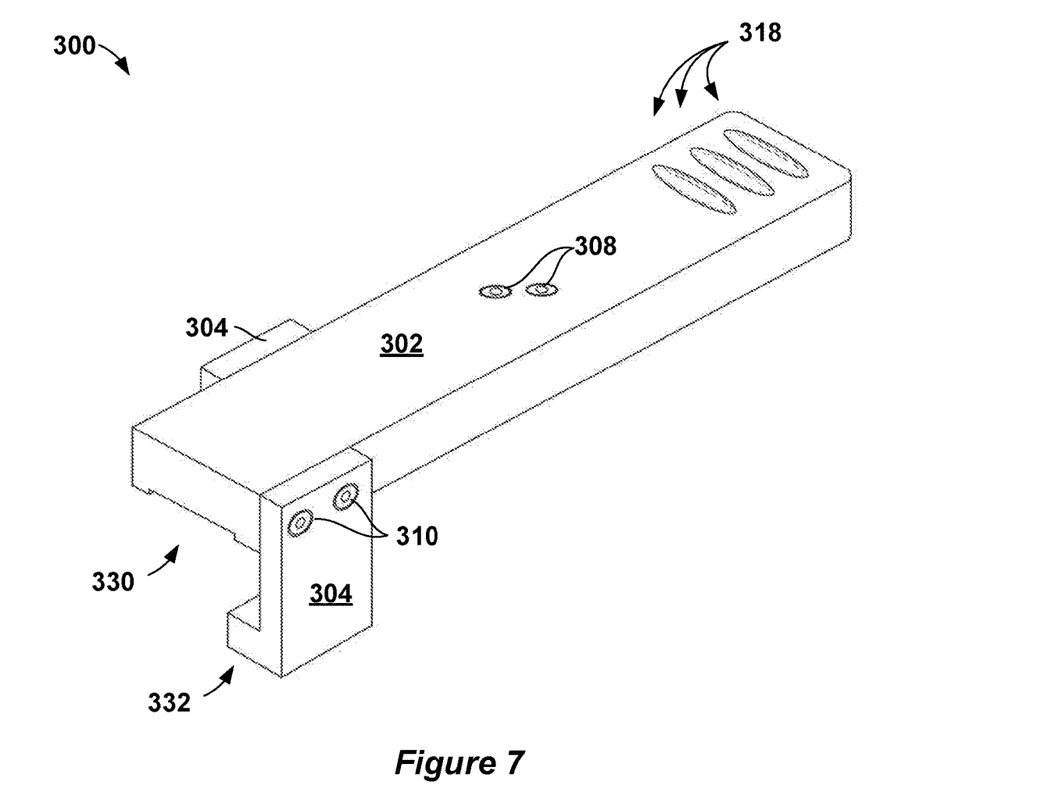
FIG. 7 is an isometric view of the support assembly, in accordance with an embodiment of the present invention.
Figure 8:
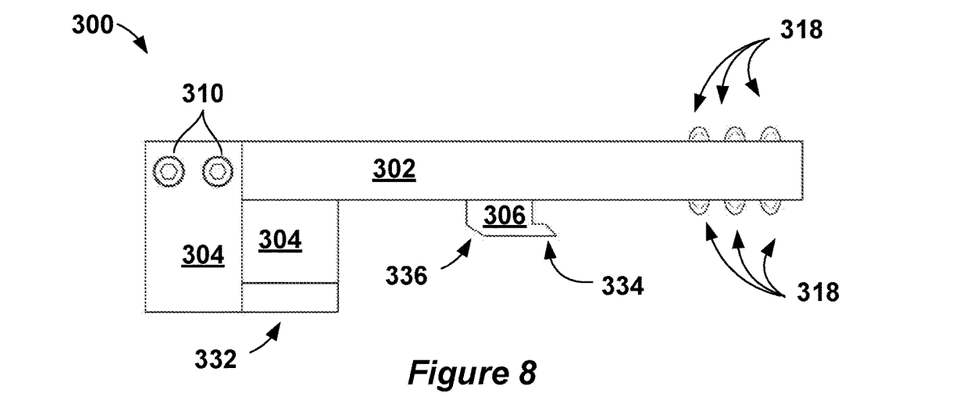
FIG. 8 is a side view of the support assembly, in accordance with an embodiment of the present invention.
Figure 9:
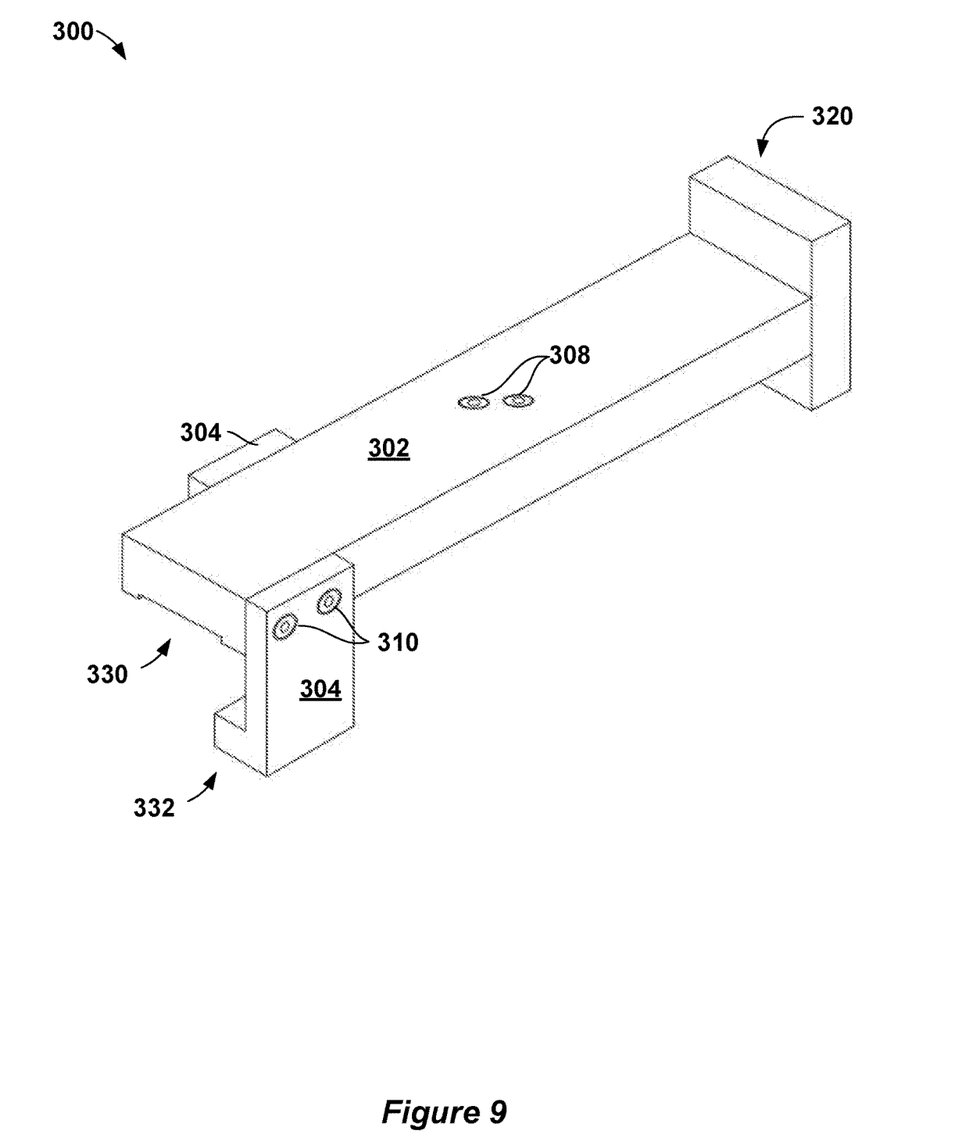
FIG. 9 is an isometric view of the support assembly, in accordance with an embodiment of the present invention.
Figure 10:
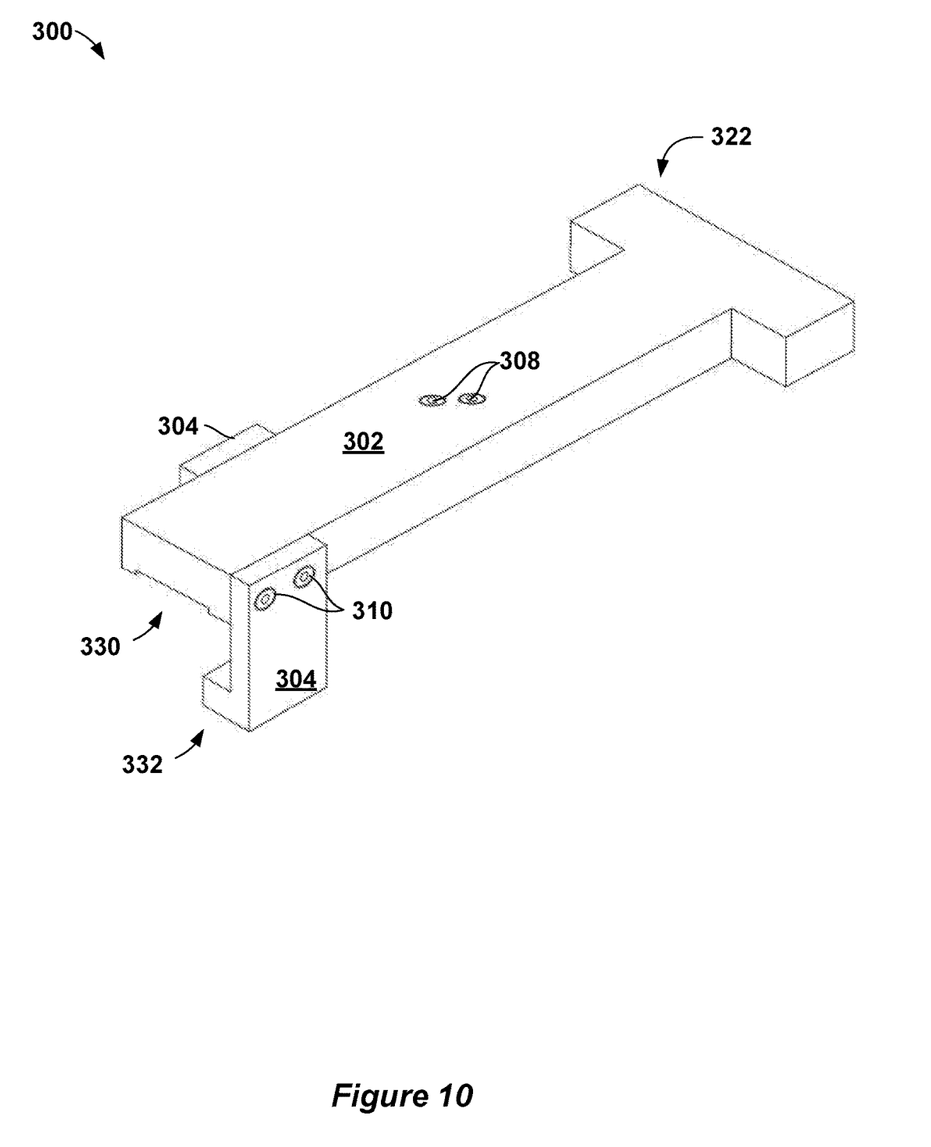
FIG. 10 is an isometric view of the support assembly, in accordance with an embodiment of the present invention.
Figure 11:
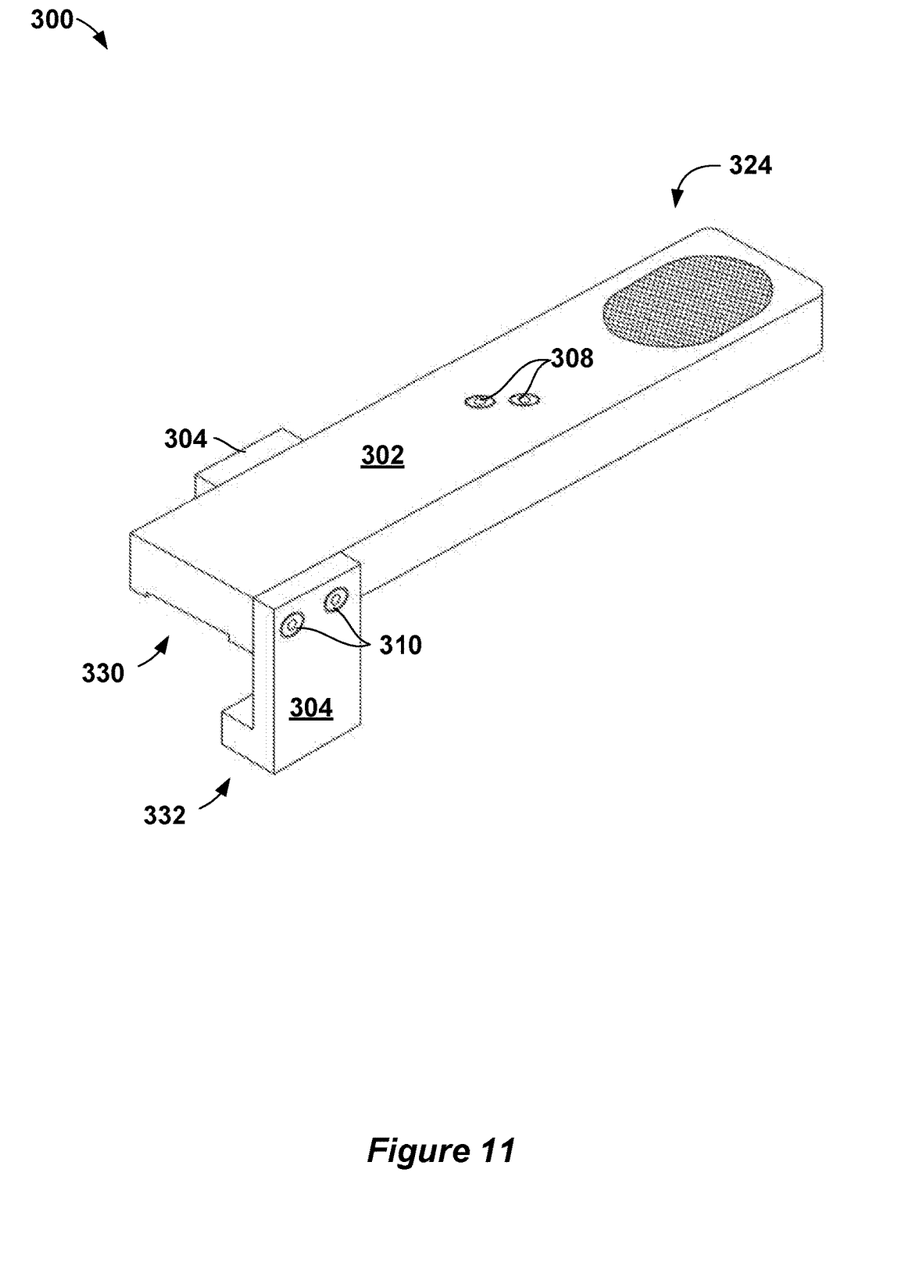
FIG. 11 is an isometric view of the support assembly, in accordance with an embodiment of the present invention.
Figure 12:
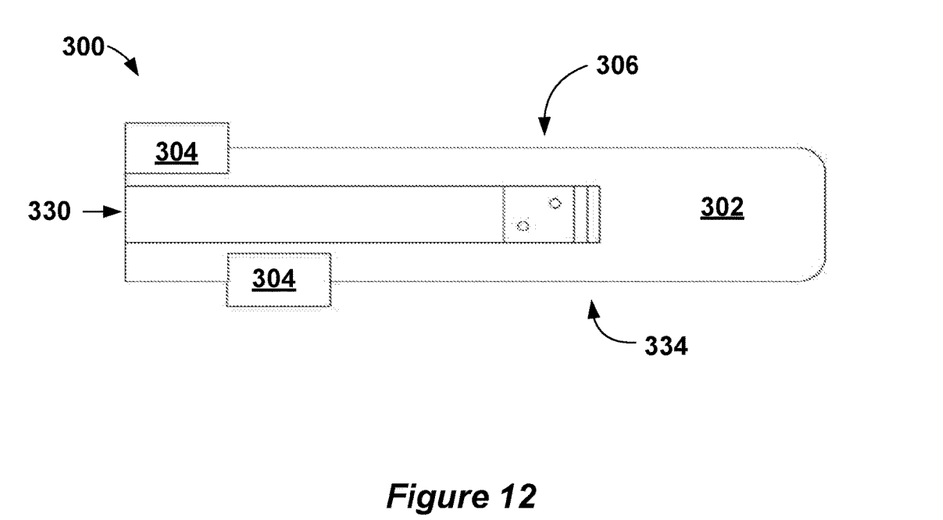
FIG. 12 is a bottom view of the support assembly, in accordance with an embodiment of the present invention.
Figure 13:
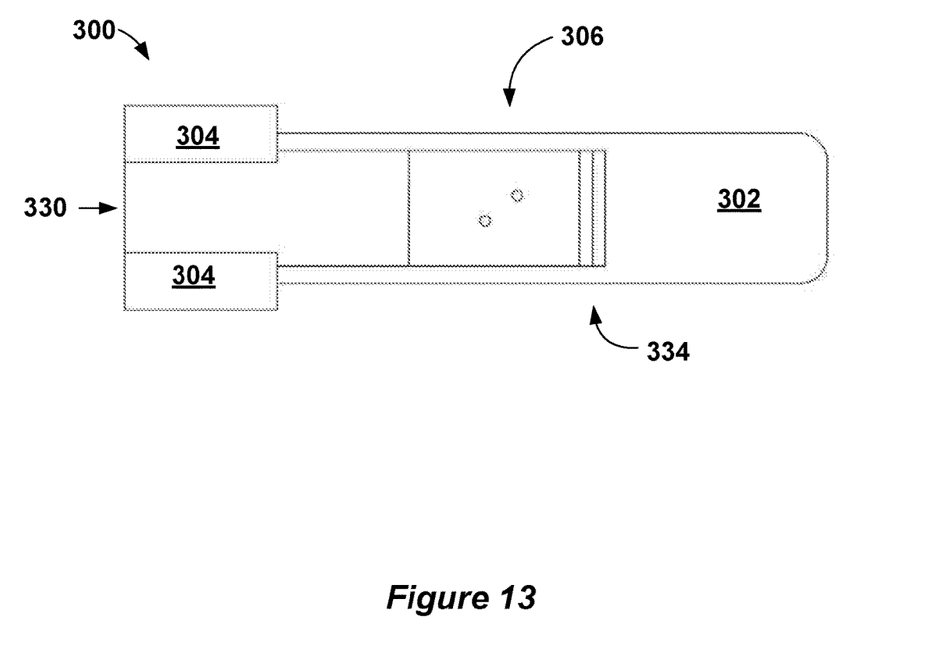
FIG. 13 is a bottom view of the support assembly, in accordance with an embodiment of the present invention.

Referring now to FIGS. 3-13, multiple views of the support assembly 300 are shown, in accordance with an embodiment of the present invention. FIG. 3 is an isometric view of the support assembly 300. FIG. 4 is an exploded isometric view of the support assembly 300. FIG. 5 is an isometric view of the support assembly 300. FIG. 6 is a side view of the support assembly 300. FIG. 7 is an isometric view of the support assembly 300. FIG. 8 is a side view of the support assembly 300. FIGS. 9, 10, and 11 are each an isometric view of the support assembly 300. FIGS. 12 and 13 are each a bottom view of the support assembly 300.

The support assembly 300 provides a mechanism used to operate the connector 204 of the fiber optic cable 200 and is designed to reduce damage during operation. The support assembly may also reduce damage to a corresponding receptacle. The support assembly 300 allows an operator to grip the support assembly 300 surrounding the connector 204, rather than directly pulling or pushing either the connector 204 or the optical cable 202, thus reducing a chance of damage to the connector 204 or the optical cable 202.

In the present embodiment, the support assembly 300 includes a handle 302, side clips 304, and a bottom clip 306.

In an embodiment, the handle 302 has an opening 312 which may be used to grip the support assembly 300 for insertion into and removal from a corresponding receptacle when the support assembly 300 is installed over the first end of the fiber optic cable 200, as will be further described below. The opening 312 may be sized for a finger, for example an oval 2.5 cm long and 2 cm wide. In an embodiment, the size and shape of the opening 312 corresponds to a special tool, which may be used to grip the handle when removing or installing the connector 204. Using such a specialized tool when repetitively removing or installing multiple connectors 204 will reduce operator fatigue. In an embodiment, the special tool would secure to the handle using a quick release mechanism operated by a trigger. For example, the special tool would automatically couple with the handle 302, using the opening 312, simply by engaging the special tool with the handle 302. To release the special tool from the handle 302, a simple pull of a trigger or push of a button would disengage the special tool from the handle 302, specifically the opening 312, allowing it to separate from the assembly.

In another embodiment, rather than the opening 312, the handle 302 may include any feature to improve an operator's grip when installing or removing the fiber optic cable 200. For example, such a feature may include a t-shaped handle, knurling, depressions, bumps or protrusions, ridges, or some combination thereof.

In an embodiment, such a feature may include one or more depressions on a top side, a bottom side, or any one or more sides of the handle 302. As shown in FIGS. 5 and 6, a depression 316 is present on the top side and on the bottom side of the handle 302.

In another embodiment, such a feature may include one or more bumps, ridges, or protrusions on a top side, a bottom side, or any one or more sides of the handle 302. As shown in FIGS. 7 and 8, three bumps 318 are present each on the top side and on the bottom side of the handle 302.

In another embodiment, the handle 302 may have a perpendicular grip 320 at an end of the handle 302, as shown in FIG. 9. In a further embodiment, the handle 302 may be a t-shaped handle 322, as shown in FIG. 10. In yet a further embodiment, the handle 302 may have knurling on a top side, a bottom side or any one or more sides of the handle 302. As shown in FIG. 11, knurling 324 is shown on the top side of the handle 302.

According to the present embodiment, the handle 302 may rest on a top surface of the connector 204. In an embodiment, the handle 302 may contact a top surface of the housing 208 and a top surface of the pull tab 214. In all cases, the handle 302 is neither above nor does it contact the metal coupling 210 to prevent any physical interference between the support assembly 300 and a corresponding receptacle which receives the metal coupling 210. According to the present embodiment, a width of the handle 302 may be less than a width of the housing 208 such that the support assembly is securely fastened to the connector 204.

The two side clips 304 and one bottom clip 306 are used to attach/secure the support assembly 300 to the connector 204; however, any number and configuration of clips (304, 306) may be used. In an embodiment, the side clips 304 are secured to opposite sides of the handle 302. In the present embodiment, the side clip 304 may be secured to the handle 302 via one or more screws 310. Alternatively, the side clips 304 can be secured to the handle 302 using press-to-close snaps, or other screwless fastening technique, eliminating the need for threaded holes and screws which has the potential to save time and money in manufacturing, parts, and assembly. An indentation 330 may be present along a bottom side of the handle 302.

In the present embodiment, as shown in FIG. 12, the two side clips 304 are positioned offset relative to each other, and not directly aligned on opposite sides of the handle 302. When the support assembly 300 is assembled and attached to the connector 204, a clamping force is applied laterally to the sides of the handle 302 by the two side clips 304. The interference fit between support assembly 300 and the connector 204 is designed to provide a secure connection and prevent movement between the support assembly 300 and the connector 204. As illustrated, the side clips 304 have a ledge 332 or a flange which extends laterally beneath the connector 204 to prevent possible vertical movement or rotation of the support assembly 300 relative to the connector 204. The bottom clip 304 may fit into the indentation 330, which may provide further support and the indentation 330 may restrict movement towards either side of the handle 302.

In an alternate embodiment, the two side clips 304 may be directly aligned on opposite sides of the handle 302, as shown in FIG. 13. In yet another embodiment, the support assembly 300 includes a single side clip capable of being secured to the connector 204 in a similar manner as described above. For example, a single clip may be secured to only one side of the handle 302 and have a longer more robust ledge or flange. In another example, the single clip may be u-shaped surrounding opposite sides and a bottom of the handle 302.

According to the present embodiment, the bottom clip 306 may be connected to a bottom of the handle 302 and is used in addition to the side clips 304 when joining the support assembly 300 to the connector 204. Specifically, the bottom clip 306 is designed to couple the handle 302 to the pull tab 214 and provide an additional connection point between the two. The bottom clip 306 is only one way of securing the pull tab 214 to the handle 302 and any combination of techniques and structures may be used. When assembling the cable support assembly 300 around the connector 204, the bottom clip 306 fits into an opening of the pull tab 214. A ledge 334 of the bottom clip 306 may overlap a lower portion of the pull tab 214, helping to securely hold the first end of the fiber optic cable 200. An angled edge 336 of the bottom clip 306 may be present to eliminate a sharp edge along the optical cable 202 when assembled. In an embodiment, the bottom clip 306 may be secured to the handle 302 via one or more screws 308. In an embodiment, as shown in FIG. 13, the size and shape of the bottom clip 306 directly corresponds to an opening in the pull tab 214. Specifically, for example, a width and length of the bottom connector 306 may be slightly smaller than a width and length of the opening in the pull tab 214. A close fit between the bottom clip 306 and the opening 310 in the handle 302 will provide additional lateral support between the support assembly 300 and the connector 204.

The bottom clip 304 may fit into the indentation 330, which may provide further support and the indentation 330 may restrict movement towards either side of the handle 302.

In an embodiment, the handle 302, the side clip 304, and the bottom clip 306 are made from materials which are non-conductive, non-electrostatic, stiff, strong, and low cost. Additionally, the handle 302, the side clip 304 and the bottom clip 304 may be machined by hand, 3D printed, produced using mass production techniques (e.g. injection molding), or other known methods. In an example, the entire support assembly 300 is made from plastic, such as, for example, Nylamid® or acrylic. Nylamid® is a registered trademark of Polymeric Resources Corp. In an example, the support assembly 300 may have a total length, length1, of approximately 115 mm, a width, width1, of approximately 23 mm, and a height, height1, ranging between approximately 10 mm for the top 502 to an assembled height, height2, of 30 mm including handle 302 and the side clip 304. The side clip 304 may have a length, length2, of 17 mm, a height, height3, of 30 mm, and a width, width2, ranging between 5 and 10 mm. The side clip 304 may have a shorter width2 along the top where the side clip 304 connects to the handle 302, and the side clip 304 may have a longer width2 along a bottom where a ledge is provided on the side clip 304. In any case, the support assembly 300 is sized appropriately based on the corresponding connector to which it will be secured to.

The screw 308 and the screw 310 should be made from materials which are anti-corrosive, stiff, strong, and low cost. In an example, the screw 308 and the screw 310 are made from stainless steel.

Figure 14A:
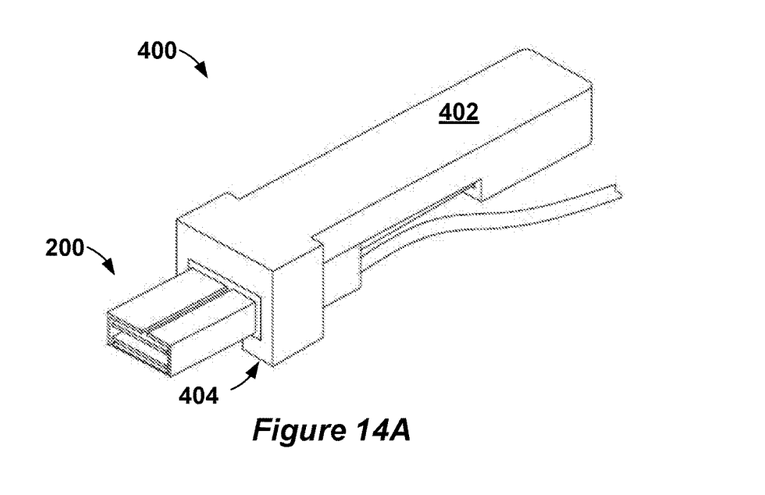
FIGS. 14A, 14B, 14C, 14D and 14E are multiple views of the support assembly, in accordance with an embodiment of the present invention.
Figure 14B:
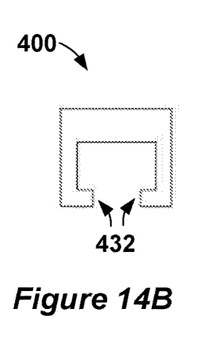
Figure 14C:
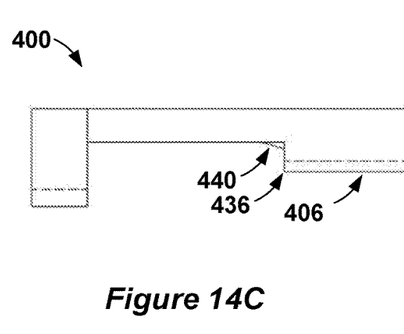
Figure 14D:
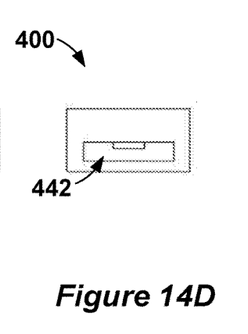
Figure 14E:
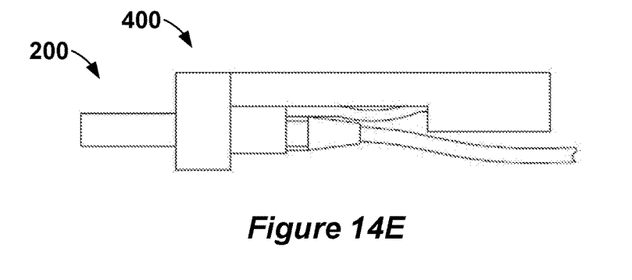

Referring now to FIGS. 14A, 14B, 14C, 14D, and 14E, multiple views of a support assembly 400 are shown, in accordance with an alternate embodiment of the present invention. FIG. 14A is an isometric view of the support assembly 400. FIG. 14B is a front view of the support assembly 400. FIG. 14C is a side view of the support assembly 400. FIG. 14D is a back view of the support assembly 400. FIG. 14E is a side view of the support assembly 400 and the first end of the fiber optic cable 200.

The assembly 400 may be manufactured from a single piece of material, thus eliminating the need for screws and assembly. As shown in FIGS. 14A-14E, the assembly 400 may include a handle 402, side clips 404, and a back portion 406. As illustrated, the side clips 404 may have a ledge 432 or a flange, similar to the ledge 332 described above, which extends laterally beneath the connector 204 to prevent possible vertical movement or rotation of the support assembly 400 relative to the connector 204. A space remains between the side clips 404 at least wide enough for the optical cable 202 to fit in the space while assembling the assembly 400 with the fiber optic cable 200.

In such cases, the back portion 406 could be designed with a ramp 440 to facilitate installation on the connector 204. When installed, the back ramp 440 would engage with the pull tab 214 and then slid toward the optical cable 202, as the pull tab slides into an opening 442 in the back portion 406. The ramp 440 of the back portion 406 prevents the pull tab 214 from being removed from the handle 402. The back portion 406 may have an angled edge at a corner 436, similar to the angled edge 336 as described above, to eliminate a sharp edge along the optical cable 202 when assembled.

In various embodiments, the assembly 400 may include any feature to improve an operator's grip when installing or removing the fiber optic cable 200, as described above in reference to embodiments of the assembly 300. Similar features of the support assembly 400 and the support assembly 300 may have correspondingly similar attributes between the two assemblies. In an embodiment, the assembly 400 will include a stop to prevent the first end of the fiber optic cable 200 from extending over the metal coupling 210 of the connector 204 or further along the optical cable 202.

In a preferred embodiment, the assembly 400 may be made from materials which are non-conductive, non-electrostatic, stiff, strong, and low cost. Additionally, assembly 400 may be machined by hand, 3D printed, produced using mass production techniques (e.g. injection molding), or other known methods. In an example, the assembly 400 is made from plastic, such as, for example, Nylamid® or acrylic.

Figure 15:
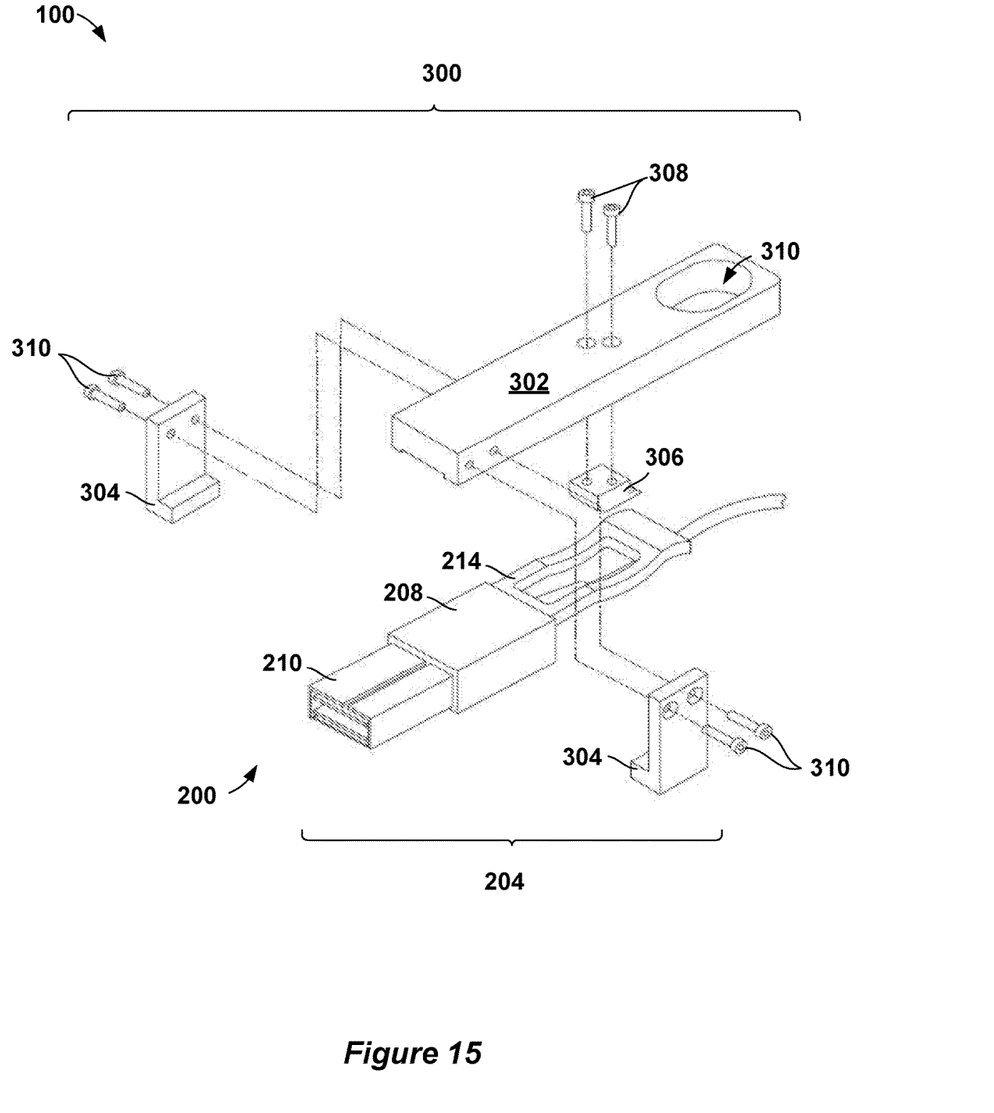
FIG. 15 is an isometric view of a first end of a fiber optic cable and an exploded isometric view of the support assembly, in accordance with an embodiment of the present invention.

Referring now to FIG. 15, an exploded isometric view of the first end of the assembly 100 is shown, in accordance with an embodiment of the present invention. The assembly 100 may include the first end of the fiber optic cable 200, and the support assembly 300, both as described above. The fiber optic cable 200 may include the connector 204, as described above.

Figure 16:
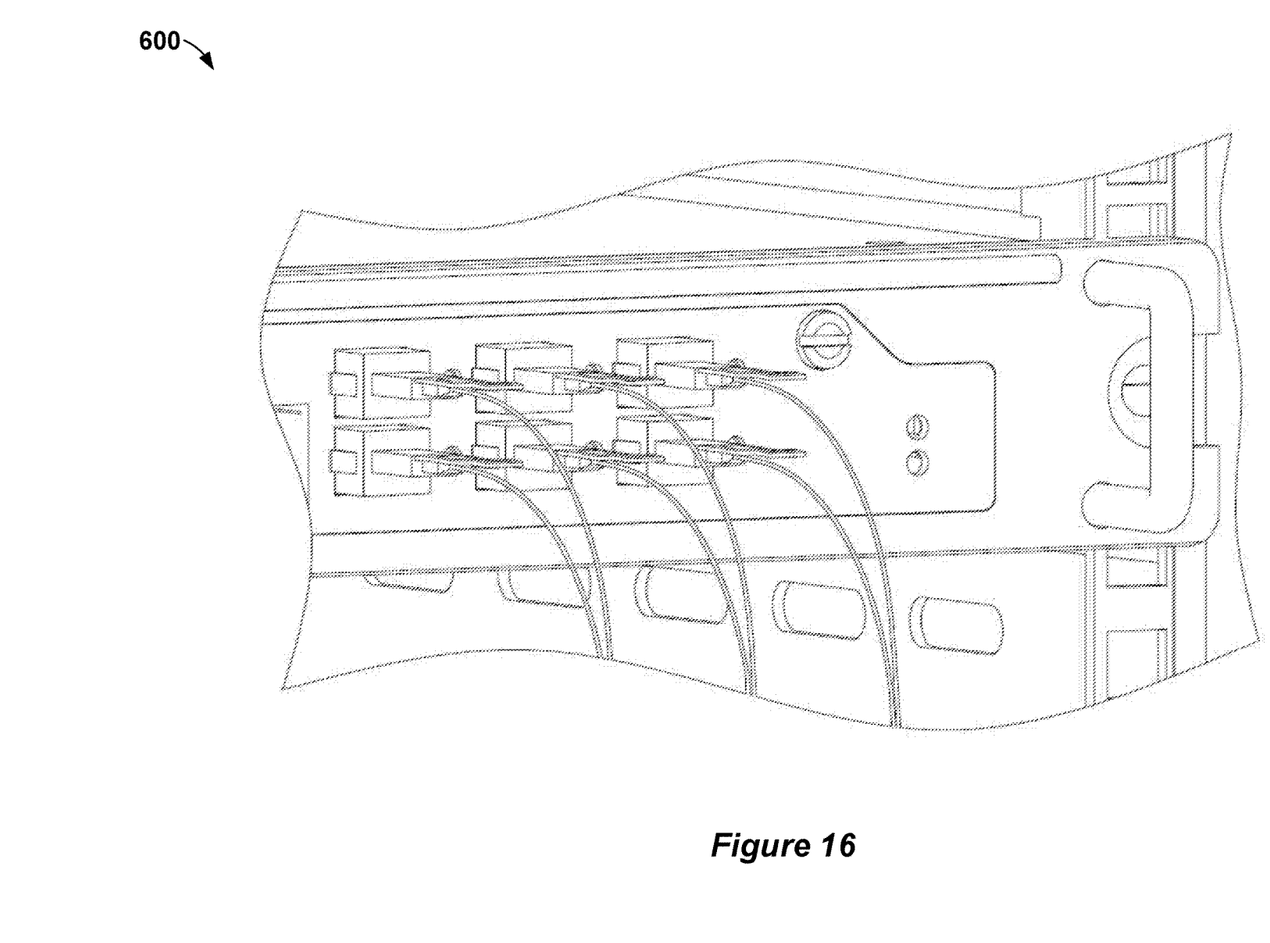
FIG. 16 is a rear view of a portion of a data center rack, in accordance with an embodiment of the present invention.
Figure 17:
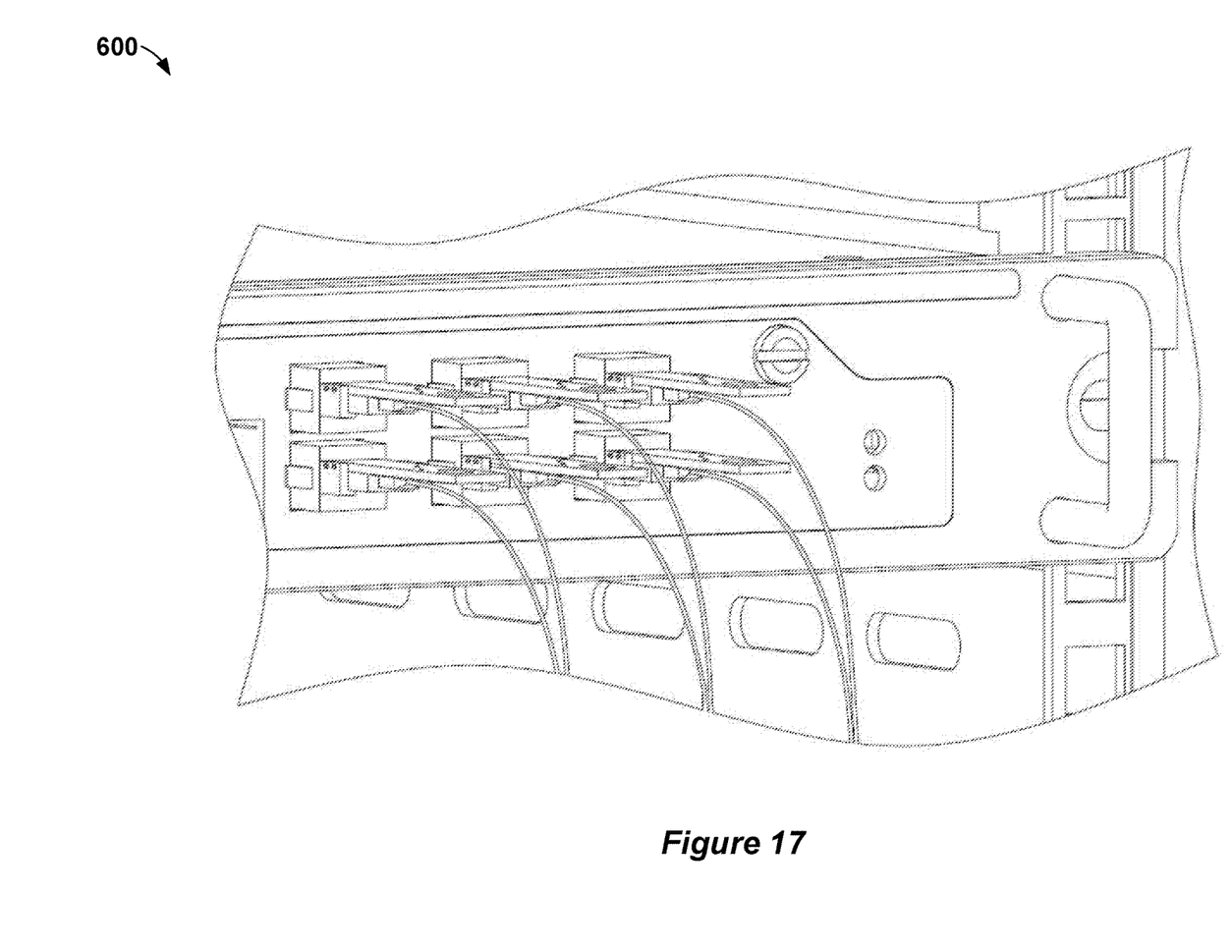
FIG. 17 is a rear view of a portion of a data center rack, in accordance with an embodiment of the present invention.

Referring now to FIGS. 16 and 17, a rear view of a portion of a data center rack 600 is shown, in accordance with an embodiment of the present invention. In this embodiment, the rack 600 has six receptacles, with a fiber optic cable 200 plugged into each receptacle. As shown, each fiber optic cable 200 has a connector 204 and a portion of an optical cable 202 is shown. FIG. 16 illustrates each receptacle of the rear view of the portion of the data center rack 600 has a fiber optic cable 200 plugged in. FIG. 17 illustrates each receptacle of the rear view of the portion of the data center rack 600 with an assembly 100, which includes a fiber optic cable 200 with the support assembly 300, plugged in. As shown, the assembly 100 fits into an existing spacing between each receptacle with no required design modification of the data center rack 600. In an embodiment, the support assembly 300 is sized appropriately such that current spacings between receptacles may be maintained with no design change required for the rack 600.

As shown in FIGS. 1-17, the support assembly 300 provides a strengthening structure surrounding the connector 204, for an operator to grip when inserting or removing the fiber optic cable 200 from a corresponding receptacle. Use of the support assembly 300 will reduce damage to the fiber optic cable 200 such as separation of the connector 204 and the optical cable 202, and reduce damage to the connector 204 from improper alignment during insertion and removal. The support assembly 300 may allow support of the fiber optic cable 200 without requiring design changes to receptacles receiving the connector 204.

For example, when the connector 204 is installed or removed from a corresponding receptacle using the support assembly 300, the stresses incurred are distributed across the entire connector rather than being concentrated at only the fiber optic cable 200 or the housing 208.

Education of an operator plugging the fiber optic cable 200 with the support assembly 300 may additionally help reduce physical breakage of the fiber optic cable.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A support assembly comprising:
    a handle on a top surface of an optical connector;
    a first side clip and a second side clip removably coupled to opposite sides of the handle, such that a clamping force is applied to opposite sides of the optical connector to prevent movement between the handle and the optical connector, wherein a first end of the first side clip is flush with a front end of the handle and a first end of the second side clip is set back from the front end of the handle; and
    a bottom clip removably coupled to a bottom of the handle, the bottom clip comprising a flange to capture a pull tab extending from a rear of the optical connector.

2. The support assembly according to claim 1, wherein each of the side clips comprises a flange extending beneath a bottom surface of the optical connector.

3. The support assembly according to claim 1, wherein a width of the handle is less than a width of the optical connector.

4. The support assembly according to claim 1, wherein the support assembly comprises plastic.

5. The support assembly according to claim 1, wherein the handle comprises a finger sized opening.

6. The support assembly according to claim 1, wherein the optical connector is an Active Optical Cable (AOC) connector.

7. The support assembly according to claim 1, further comprising a depression in the handle.

8. The support assembly according to claim 1, further comprising a grip ridge in the handle.

9. The support assembly according to claim 1, further comprising knurling in the handle.

10. An Active Optical Cable (AOC) connector support assembly comprising:
    a handle comprising a finger sized opening;
    side clips secured to opposite sides of the handle, such that a clamping force is applied to opposite sides of an AOC connector to prevent movement between the handle and the AOC connector; and
    a bottom clip secured to and extending down from a bottom surface of the handle to couple the AOC connector support assembly to the AOC connector, wherein the bottom clip comprises a flange that engages with an opening of a pull tab of the AOC connector.

11. The AOC connector support assembly according to claim 10, wherein each of the side clips comprises a flange extending beneath a bottom surface of the AOC connector.

12. The AOC connector support assembly according to claim 10, wherein a width of the handle is less than a width of the AOC connector.

13. The AOC connector support assembly according to claim 10, wherein the AOC connector support assembly comprises plastic.

14. The AOC connector support assembly according to claim 13, further comprising a depression in the handle.

15. A support assembly comprising:
    a handle secured to a top surface of an optical connector, wherein the handle comprises finger sized opening at one end of the handle;
    side clips secured to opposite sides of the handle, such that a clamping force is applied to the opposite sides of the optical connector to prevent movement between the handle and the optical connector, wherein each of the side clips comprises a flange extending beneath a bottom surface of the optical connector, wherein the side clips are offset relative to each other; and
    a bottom clip secured to a bottom of the handle, the bottom clip comprising a flange to capture a pull tab extending from a rear of the optical connector.

16. The support assembly according to claim 15, wherein the support assembly is situated relative to the optical connector to prevent any physical interference between the support assembly and a corresponding receptacle designed to receive the optical connector.

17. The support assembly according to claim 15, wherein a width of the handle is less than a width of the optical connector.

18. The support assembly according to claim 15, wherein the support assembly comprises plastic.

* * * * *